United States Patent [19]

Kanazawa et al.

[11] Patent Number: 4,621,702
[45] Date of Patent: Nov. 11, 1986

[54] FOUR-WHEEL STEERING APPARATUS OF A VEHICLE

[75] Inventors: Hirotaka Kanazawa; Teruhiko Takatani; Shigeki Furutani, all of Hiroshima; Isamu Chikuma, Maebashi; Satoru Shimada, Maebashi; Hiroshi Eda, Maebashi, all of Japan, 99

[73] Assignees: Mazda Motor Corp., Hiroshima; Nippon Seiko K.K., Tokyo, both of Japan

[21] Appl. No.: 647,431

[22] Filed: Sep. 5, 1984

[30] Foreign Application Priority Data

Sep. 8, 1983 [JP] Japan ............... 58-164133
Sep. 8, 1983 [JP] Japan ............... 58-164134
Sep. 8, 1983 [JP] Japan ............... 58-164135

[51] Int. Cl.⁴ .................................. B62D 5/06
[52] U.S. Cl. ........................... 180/140; 180/236; 280/91
[58] Field of Search .......... 180/140, 234, 236; 280/91, 99, 100

[56] References Cited

U.S. PATENT DOCUMENTS

| | | | |
|---|---|---|---|
| 3,351,147 | 11/1967 | Williamson | 180/234 |
| 3,596,730 | 8/1971 | Cecce | 180/236 |
| 3,856,102 | 12/1974 | Queen | 180/140 |
| 4,140,199 | 2/1979 | Lester | 180/140 |
| 4,223,611 | 9/1980 | Dawson et al. | 180/140 |
| 4,295,657 | 10/1981 | Sano et al. | 280/91 |
| 4,373,603 | 2/1983 | Nelson | 180/236 |
| 4,446,941 | 5/1984 | Laurichtnoct | 180/140 |
| 4,483,547 | 11/1984 | Furukawa et al. | 180/236 |

FOREIGN PATENT DOCUMENTS 20565 2/1983 Japan ...................... 180/140

Primary Examiner—Ira S. Lazarus
Attorney, Agent, or Firm—Fitzpatrick, Cella, Harper & Scinto

[57] ABSTRACT

In a four-wheel steering apparatus of a vehicle for steering also the rear wheels in conformity with the steering of the front wheels by a steering wheel, a control force for a rear wheel steering device is mechanically taken out from a front wheel steering device and is suitably controlled in the intermediate portion and is transmitted as a steering control force to the rear wheel steering device, whereby the front wheels and the rear wheels are steered in the same direction when the absolute value of the steering angle of the front wheels is less than a predetermined value, and the rear wheels are steered in the direction reverse to the front wheels when the absolute value is greater than the predetermined value. In the intermediate portion, the taken-out control force is divided into a same direction steering control force for steering the rear wheels in the same direction as the front wheels and a reverse direction steering control force for steering the rear wheels in the direction reverse to the front wheels, and the reverse direction steering control force is absorbed and only the same direction steering control force is transmitted to the rear wheel steering device when the absolute value is less than the predetermined value, and the same direction steering control force is absorbed and only the reverse direction steering control force is transmitted to the rear wheel steering device when the absolute value is greater than the predetermined value.

5 Claims, 10 Drawing Figures

4,621,702

FOUR-WHEEL STEERING APPARATUS OF A VEHICLE

BACKGROUND OF THE INVENTION

1. Field of the Invention

This invention relates to a four-wheel steering apparatus of a vehicle, that is, an apparatus for steering also the rear wheels in conformity with the steering of the front wheels by the steering wheel.

2. Description of the Prior Art

Heretofore, it has usually been the case with the steering of a four-wheel vehicle that only the front wheels are steered by the steering wheel. However, steering only the front wheels has given rise to problems in respect of manoeuvrability and dirigibility, including the problem that lateral slippage occurs to the rear wheels depending on the running condition and the turning radius is limited so that small turns cannot be made. In view of this, four-wheel steering apparatuses for steering also the rear wheels with the front wheels have recently be studied and proposed.

That is, in a four-wheel steering apparatus, if the rear wheels are steered in the same direction as the direction of steering of the front wheels during running at a relatively high speed, a lateral force is applied to the front and rear wheels at a time and therefore, the posture of the vehicle can be substantially kept on the tangential line of the turning circle without any phase delay from the steering of the steering wheel and, for example, the lane change during high speed running can be accomplished smoothly. Also, if the rear wheels are steered in the direction reverse to the direction of steering of the front wheels during very low speed running, the direction of the vehicle can be changed greatly and thus, no trouble will occur even in a case where it is necessary to turn the vehicle greatly in a narrow space for the purpose of tandem parking or bringing the vehicle into a garage.

Such a four-wheel steering apparatus can theoretically be realized by various systems, but the use of many electrical means or hydraulic means will lead to a relatively high cost and a complicated mechanism and further to problems in respect of maintenance and reliability such as safety when trouble occurs.

SUMMARY OF THE INVENTION

In view of the above-noted points and further of the demand for a four-wheel steering apparatus for steering also the rear wheels in the same direction as the front wheels in a range in which the front wheels are slightly steered and steering the rear wheels in the reverse direction when the front wheels are greatly steered, which demand arises when it is considered that the front wheels are not greatly steered during relatively high speed running and are greatly steered during relatively low speed running, the present invention intends to provide a four-wheel steering apparatus of simple structure and reliable operation with which to control a rear wheel steering device in conformity with the operation of a front wheel steering device, a steering control force for the rear wheel steering device is taken out from the front wheel steering device and is transmitted to the rear wheel steering device, whereby the front and rear wheels are steered in the same direction when the absolute value of the steering angle of the front wheels is less than a predetermined value, and the rear wheels are steered in the direction reverse to the front wheels when said absolute value is greater than the predetermined value.

The present invention achieves the above object by a construction in which a control force for the rear wheel steering device is taken out as a rotational force or a direct-acting force from the front wheel steering device and is divided into a same direction steering control force for steering the rear wheels in the same direction as the front wheels and a reverse direction steering control force for steering the rear wheels in the direction reverse to the front wheels and these control forces are suitably controlled and transmitted to the rear wheel steering device.

DESCRIPTION OF THE PREFERRED EMBODIMENTS

The invention will hereinafter be described in detail by reference to the drawings which show some embodiments thereof.

Figure 1:
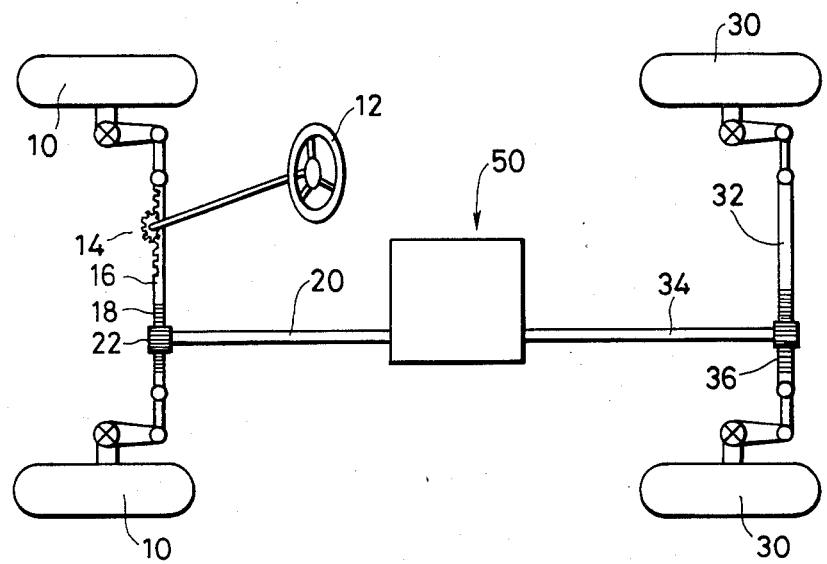
FIG. 1 is a schematic plan view of a first embodiment of the present invention.

FIG. 1 shows an example in which a control force for the rear wheel steering device is taken out as a rotational force from the front wheel steering device. In FIG. 1, front wheels 10 are adapted to be steered to the left or right by operation of a steering wheel 12 through a rack and pinion mechanism 14, a rack shaft 16, etc. Rack portion 18 is provided on the rack shaft 16, and a pinion 22 fixed to a rotary shaft 20 is in mesh engagement with the rack portion 18.

Figure 2:
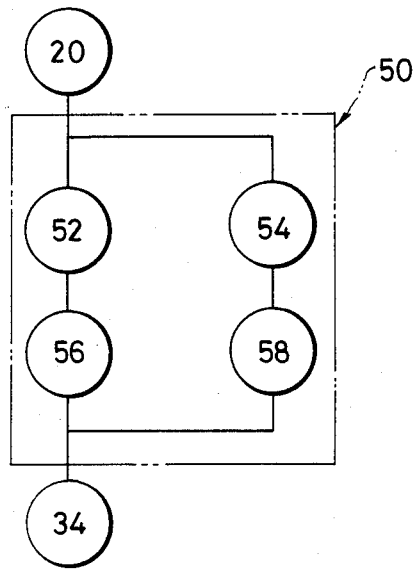
FIG. 2 is a block diagram for illustrating the rear wheel steering control device in FIG. 1.

Rear wheels 30 are adapted to be steered to the left or right through a rack and pinion mechanism 36 formed between another rack shaft 32 and another rotary shaft 34, in conformity with the direction of rotation of the rotary shaft 34. The rotary shafts 20 and 34 are connected together by a rear wheel steering control device 50. In the rear wheel steering control device 50, as shown in FIG. 2, there are arranged in tandem a same direction steering control force transmitting device 52 for transmitting a steering contol force for steering the rear wheels 30 in the same direction as the front wheels from the front wheel steering device 12, 14, 16 to the rear wheel steering device 32, 34, 36, a reverse direction steering control force transmitting device 54 for transmitting from the front wheel steering device to the rear wheel steering device a reverse direction steering control force for steering the rear wheels in the direction reverse to the front wheels, said reverse direction steering control force being amplified more than said same direction steering control force, a reversible direction transmitting device 56 for transmitting the operation by the same direction steering control force during the operation of only the same direction steering control force transmitting device and for absorbing the operation by said same direction steering control force and transmitting only the operation by said reverse direction steering control force to the rear wheel steering device when the rotational force transmitted by the rotary shaft 20 is reversed in direction by a variation in the steering angle of the front wheels and is imparted as the reverse direction steering control force with the same direction steering control force, and an insensitive zone setting device 58 for not transmitting the operation by said reverse direction steering control force when the steering angle of the front wheels is within a predetermined angle range and for transmitting the operation by said reverse direction steering control force reversed and increased as described above when the steering angle of the front wheels is not within said predetermined angle range, and a control force is suitably transmitted to the rotary shaft 34 which effects the steering of the rear wheels.

Figure 3:
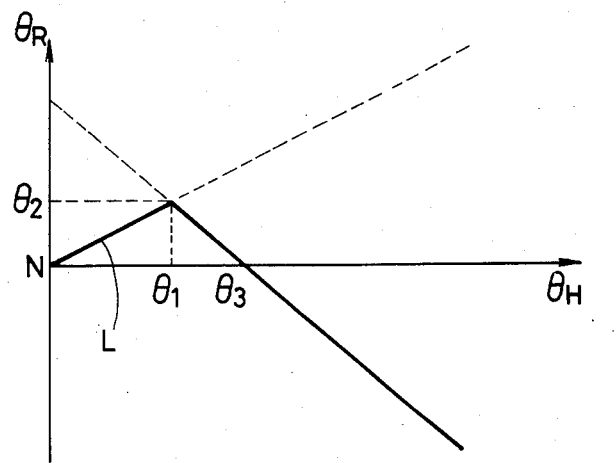
FIG. 3 is a graph for explaining the operation.

Operation of the present embodiment will now be described. When the steering wheel 12 is turned rightwardly, the rack shaft 16 is moved leftwardly (downwardly as viewed in FIG. 1) through the rack and pinion mechanism 14 and the front wheels 10 are steered to the right while, at the same time, the rotary shaft 20 is turned rightwardly as viewed from the right of FIG. 1, i.e., the rear of the vehicle, through the rack portion 18 and the pinion 22. Referring to FIG. 3, when the steering angle $\theta_H$ of the front wheels 10 is smaller than an angle $\theta_1$, the rightward turning force of the rotary shaft 20 is intactly transmitted to the rotary shaft 34 through only the same direction steering control force transmitting device 52 and via the reversible direction transmitting device 56 and turns the rotary shaft 34 also rightwardly. Thereby the shaft member 32 is moved leftwardly (downwardly as viewed in FIG. 1) and the rear wheels 30 also are steered to the right. At this time, the front wheels 10 and the rear wheels 30 are in the same phase and, as indicated by a straight line L in FIG. 3, the steering angle $\theta_H$ of the front wheels 10 and the steering angle $\theta_R$ of the rear wheels 30 are substantially proportional to each other. By so steering the rear wheels 30 in the same direction by an angle proportional to the steering angle $\theta_H$ of the front wheels 10, stable steering during high speed running becomes possible as described hereinbefore.

When the steering angle $\theta_H$ of the front wheels 10 becomes equal to or greater than $\theta_1$, both of the same direction steering control force transmitting device 52 and the reverse direction steering control force transmitting device 54 operate, but since such amplification is effected that said reverse direction steering control force is greater than said same direction steering control force, said same direction steering control force is absorbed by the action of the reversible direction transmitting device 56 and only said reverse direction steering control force is transmitted and the rotary shaft 34 begins to rotate in the direction opposite to the direction of rotation of the rotary shaft 20. Thus, the rear wheels 30 are gradually steered from a state in which they are steered by an angle $\theta_2$ toward the opposite direction.

When the rightward steering angle $\theta_H$ of the front wheels 10 exceeds $\theta_1$ but is still within $\theta_3$, the rear wheels 30 are still in a state in which they have been steered in the same direction as the front wheels 10 even if the same direction steering control force transmitting device 52, the reverse direction steering control force transmitting device 56 and the reversible direction transmitting device 54 operate as previously described. However, when the rightward steering angle $\theta_H$ of the front wheels 10 exceeds $\theta_3$, the rear wheels 30 change over from a state in which the steering angle thereof is zero to a state in which they have been steered leftwardly and thereafter, the rear wheels are gradually steered leftwardly at an angle proportional to the steering angle $\theta_H$ of the front wheels 10.

Even when the front wheels 10 are steered from their neutral position N to the left, what has been described above applies except that the movement becomes opposite.

Reference is now had to FIGS. 4 to 7 to describe the rear wheel steering control device 50 more specifically.

Figure 5:
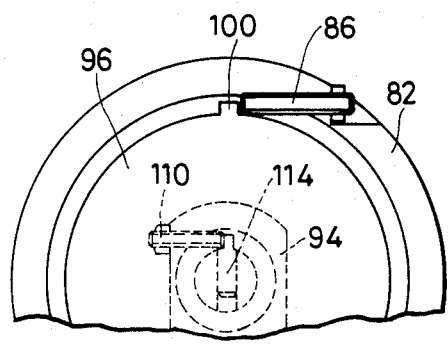
FIG. 5 is a cross-sectional view taken along line V—V of FIG. 4.
Figure 4:
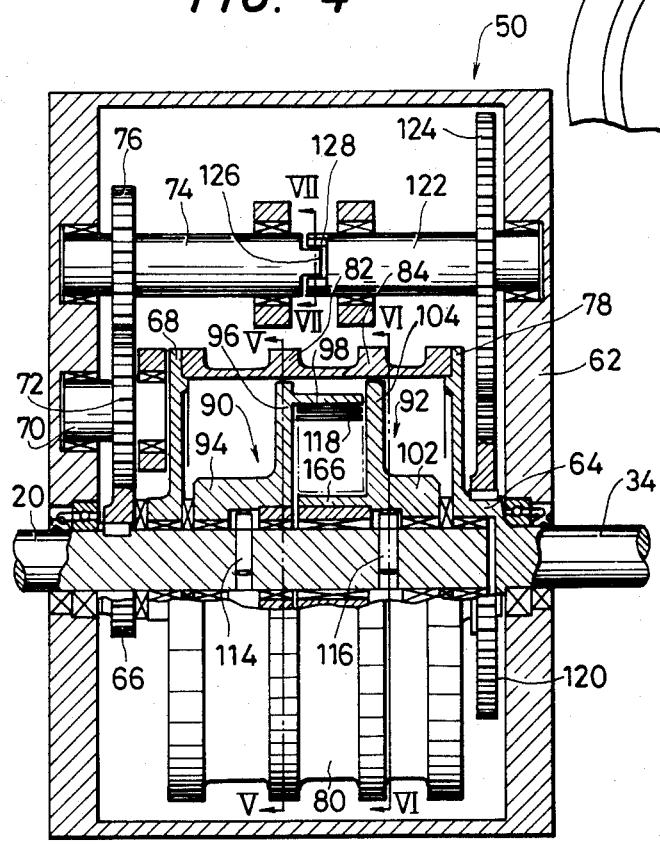
FIG. 4 is a cross-sectional view of a specific example of the rear wheel steering control device of FIG. 2.
Figure 6:
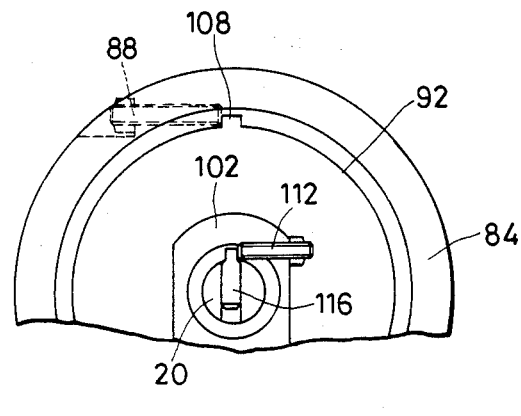
FIG. 6 is a cross-sectional view taken along line VI—VI of FIG. 4.

In FIG. 4, the input shaft 20 and the output shaft 34 are rotatably supported below a box-like housing 62, and the free end of the input shaft 20 is fitted to the fitting portion 64 of the output shaft 34. On the input shaft 20, a gear 66 is fixed toward one side wall of the housing 62 and a flange member 68 is rotatably mounted. The gear 66 is in mesh engagement with an idle gear 72 secured to a rotary shaft 70, and the idle gear 72 in turn is in mesh engagement with a gear 76 on a rotary shaft 74 rotatably mounted in the upper portion of the housing 62. The flange member 68 and a flange portion 78 formed contiguously to the output shaft 34 are interconnected by a cylindrical member 80, and the flange member 68, the cylindrical member 80 and the output shaft 34 provided with the flange portion 78 are adapted to be rotated together. Two ribs 82 and 84 are formed on the outer peripheral surface of the intermediate portion of the cylindrical member 80 and, as shown in FIGS. 5 and 6, bolts 86 and 88 are threadably engaged with the ribs 82 and 84, respectively, in a direction orthogonal to the radial direction of the cylindrical member 80 and in opposite directions.

A pair of rotatable members 90 and 92 are rotatably mounted in the space defined by the flange member 68, the cylindrical member 80 and the flange portion 78. One of the rotatable members, 90, comprises a fitting portion 94 fitted to the input shaft 20, a flange portion 96 and a cylindrical portion 98 axially extending from a portion near the outer periphery of the flange portion 96, and has a projection 100 on the outer periphery of the flange portion 96. The other rotatable member 92 comprises a fitting portion fitted to the input shaft 20, a flange portion 104 and a cylindrical portion 106 axially extending from a portion near the inner periphery of the flange portion 104, and has a projection 108 on the outer periphery of the flange portion 104. Also, as is apparent from FIGS. 5 and 6, bolts 110 and 112 are threadably engaged with the fitting portions 94 and 102, respectively, in opposite directions and can bear against pins 114 and 116, respectively, inserted over the input shaft 20. A torsion spring 118 is disposed in the space defined by the two flange portions 96, 104 and the two cylindrical portions 98, 106, and the opposite ends thereof are restrained by the outer cylindrical portion 98 and the inner cylindrical portion 106, respectively. This spring 118 biases the rotatable member 90 rightwardly and the rotatable member 92 leftwardly with a predetermined set load, whereby the projections 100 and 108 bear against the pins 86 and 88, respectively.

A gear 120 is secured to the fitting portion 64 of the output shaft 34, and this gear 120 is in mesh engagement with a gear 124 secured to a rotary shaft 122 rotatably mounted in the housing 62 in opposed relationship with said rotary shaft 74 and coupled to the rotary shaft 74 through a meshing clutch mechanism with a play.

Figure 7:
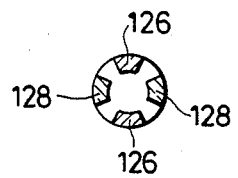
FIG. 7 is a cross-sectional view taken along line VII—VII of FIG. 4.

In the clutch mechanism portions of the inner ends of the rotary shafts 74 and 122, a pair of projections 126 and 128 are diametrically spaced apart from each other as shown in FIG. 7, and rotation of the rotary shaft 20 is adapted to be transmitted to the rotary shaft 34 after these projections bear against each other.

Operation of the rear wheel steering control device 50 will now be described.

Assuming that the steering wheel 12 has been turned rightwardly, the input shaft 20 is turned rightwardly through the mesh engagement between the rack 18 and the pinion 22. When the input shaft 20 is turned rightwardly, the rotatable member 92 is turned rightwardly through the contact between the pin 116 and the bolt 112 of FIG. 6. At this time, the spring 118 does not substantially flex because the set load thereof is set to a value greater than the rotational force of the rotatable member 92, i.e., the input shaft 20, and the rotatable member 90 is turned rightwardly with the rotatable member 92 through the spring 118. Thus, the cylindrical member 80, namely, the output shaft 34, is turned rightwardly through the contact between the projection 100 and the bolt 86 of FIG. 5.

When the input shaft 20 is turned rightwardly, the rotary shaft 74 also is turned rightwardly through the gears 66, 72 and 76, but when the steering angle $\theta_H$ of the front wheels 10 is smaller than the angle $\theta_1$, the rotation transmitted to the rotary shaft 64 through the gears 66, 72 and 76 is absorbed as a lost motion and is not transmitted to the rotary shaft 122 because there is a predetermined spacing between the projection 126 of the rotary shaft 74 and the projection 128 of the rotary shaft 122.

Thus, when the steering angle $\theta_H$ of the front wheels 10 is smaller than the angle $\theta_1$, only the same direction steering control force is transmitted and both of the front wheels 10 and the rear wheels 30 are steered to the right.

When the steering wheel 10 is continuously turned rightwardly and the steering angle $\theta_H$ of the front wheels 10 becomes greater than the angle $\theta_1$, a rightward turning force is applied from the input shaft 20 to the rotatable member 92 and a leftward turning force is applied to the rotatable member 90 through the rotary shafts 74, 122 and the output shaft 34 and thus, the spring 118 is deformed by these two forces. That is, when the amount of rotation of the input shaft 20 exceeds a predetermined value, the projection 126 of the rotary shaft 74 bears against the projection 128 of the rotary shaft 122 and thus, these two rotary shafts 74 and 122 are turned rightwardly together. As a result, the output shaft 34 and the cylindrical member 80 are turned leftwardly through the gears 124 and 120 and the rotatable member 90 are turned leftwardly through the contact between the projection 100 and the bolt 86.

The set load of the spring 118 is determined so that when a rotational force has been applied only from the rotatable member 92 side, the spring 118 does not flex, but when rotational forces in the opposite directions have been applied from the both rotatable members 90 and 92, the spring 118 flexes and therefore, the rotation of the rotatable member 92, namely, the input shaft 20, is offset and absorbed by such deformation and is not transmitted to the output shaft 34. The gears 66, 72 and 76 and the gears 124 and 120, as described above, have their arrangement, their numbers of teeth, their radii, etc. chosen so that they rotate the output shaft 34 in the direction opposite to the direction of rotation of the input shaft 20 and moreover rotate the rotatable member 90 with a force great enough to flex the spring 118.

The example shown in FIG. 1 is one in which the front wheels 10 are driven by a manual steering system and the rear wheels 30 are also steered by a mechanical system, and an example of the power steering system will now be described by reference to FIG. 8 which is a plan view similar to FIG. 1.

When the steering wheel 12 is rotatively operated, a control valve 130 is controlled and a piston rod 132 is moved to the left or right relative to a power cylinder 134, whereby the front wheels 10 are steered. That is, the pressurized oil in a hydraulic pump 136 is sucked up by a hydraulic pump 138 and one of the flows divided by a flow divider 140 is controlled by the control valve 130 and enters the left or right chamber of the power cylinder 134 to move the piston rod 132.

On the other hand, the other of the flows divided by the flow divider 140 is controlled by a control valve 142 in the rear wheel steering device and enters a power cylinder 144 to move a piston rod 146 and steer the rear wheels 30 as in the case of the front wheels 10. This control valve 142 is controlled by the rotary shaft 34 and thus, the front and rear wheels 10 and 30 are steered in a manner similar to that hitherto described.

Figure 8:
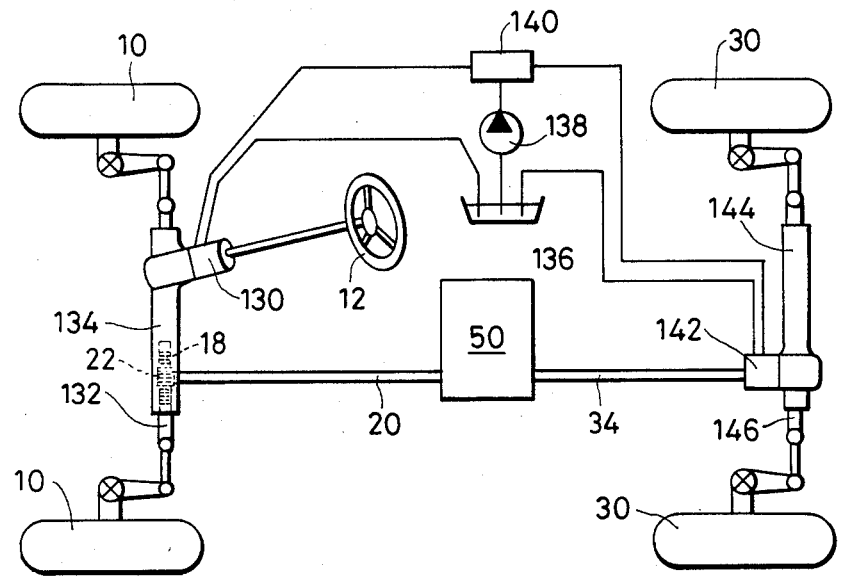
FIG. 8 is a view similar to FIG. 1 but showing another embodiment of the present invention.

In other words, in the example shown in FIG. 1, the front and rear wheels 10 and 30 are mechanically steered, where as in the Example shown in FIG. 8, the front and rear wheels are hydraulically steered and along therewith, the control force taken out from the front wheel steering device is not utilized as a force for directly steering the rear wheels 30, but is utilized as a force for controlling the control valve 142.

Figure 9:
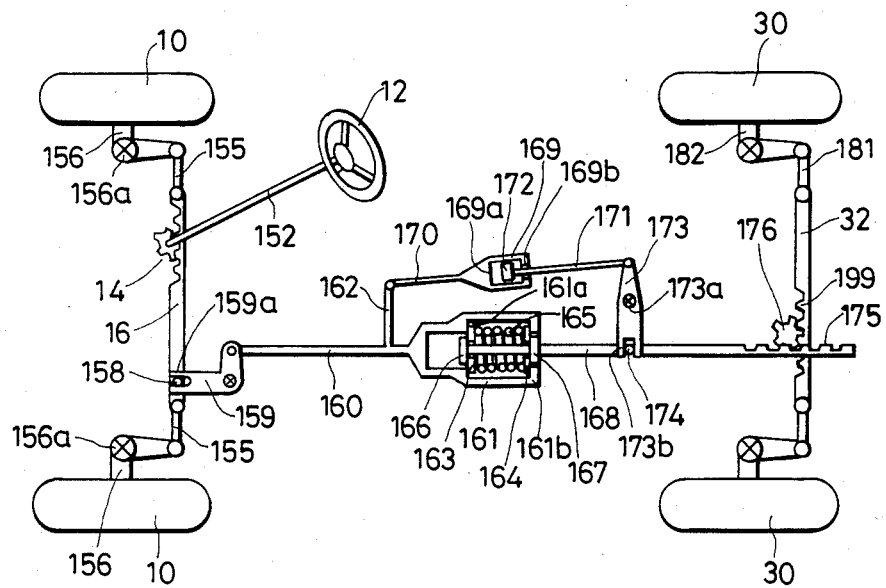
FIG. 9 is a plan view of another embodiment of the present invention.
Figure 10:
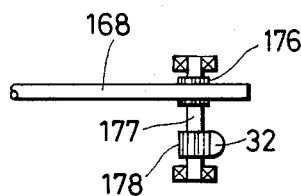
FIG. 10 is a partial view of a portion of FIG. 9 as seen from a different angle.

Reference is now had to FIGS. 9 and 10 to describe another embodiment of the present invention. In these Figures, portions common to those of the previously described embodiment are designated by similar reference numerals. FIG. 9 is a schematic plan view of a vehicle equipped with another embodiment of the present invention. In FIG. 9, the rotation of a steering shaft 152 by the steering operation of the steering wheel 12 is converted into the direct action of the rack shaft 16 by a conventional rack and pinion mechanism 14. The opposite ends of the rack shaft 16 are connected to knuckle arms 156 through side rods 155, and the knuckle arms 156 swing leftwardly and rightwardly about pivots 156a in accordance with the leftward and rightward (vertical as viewed in FIG. 9) linear action of the rack shaft 16, whereby the front wheels 10 are steered through a conventional mechanism, not shown.

The rack shaft 16 has embedded therein a pin 158 which is engaged with the bifurcated portion 159a of an L-shaped link 159. Pin-coupled to the L-shaped link 159 is a rod member 160 which is input shaft means connected to the front vehicle steering device comprised of the rack shaft 16, etc. The rod member 160 is moved to the left and right as viewed in FIG. 9, namely, back and forth of the vehicle, in accordance with the pivotal movement of the L-shaped link 159. The rod member 160 has a cylinder portion 161 and a branch portion 162, and a first linear acting member 163, a second linear acting member 164 and a spring member 165 are contained in the cylinder portion 161. Extending through these members is an output shaft 168 having two flange portions 166 and 167. The first linear acting member 163 is engaged with a first shoulder 161a of the cylinder portion 161 so as to receive from the rod member 160 only a force in a first direction which is the rightward direction as viewed in FIG. 9. The second linear-acting member 164 is engaged with a second shoulder 161b of the cylinder portion 161 so as to receive from the rod member 160 only a force in a second direction which is the leftward direction as viewed in FIG. 9. The spring member 165 is disposed between and bears against the first and second linear-acting members 163 and 164 and biases these members in second and first directions, respectively, with a predetermined set load. The two flange portions 166 and 167 of the output shaft 168 are engaged with the first linear-acting member 163 and the second linear-acting member 164, respectively. Thus, the output shaft 168 receives from the first linear-acting member 163 a force in a second direction while it imparts thereto a force in a first direction, and receives from the second linear-acting member 164 a force in a first direction while it imparts thereto a force in a second direction. The above-mentioned predetermined set load is set to a value greater than the force from the rod member 160 and therefore, unless other force is applied to the output shaft 168, the leftward and rightward movement of the rod member is intactly transmitted to the output shaft 168 through the second shoulder 161b, the second linear-acting member 164, the spring member 165, the first linear-acting member 163 and the flange portion 166 or through the first shoulder 161a, the first linear-acting member 163, the spring member 165, the second linear-acting member 164 and the flange portion 167 and moves the output shaft 168 in the same direction as the rod member 160.

On the other hand, another rod member 170 having a cylinder portion 169 is pin-coupled to the branch portion 162 of the rod member 160 and the piston portion 172 of a piston rod 171 is fitted in the cylinder portion 169. Accordingly, the leftward and rightward movement of the rod member 170 is transmitted to the piston rod 171 to move the piston rod 171 in the same direction when the piston portion 172 bears against one of the left and right walls 169a and 169b of the cylinder portion 169. However, at a position between the positions at which the piston portion bears against the left and right walls 169a and 169b, no movement is transmitted from the rod member 170 to the piston rod 171 due to the lost motion action and as it were, an insensitive zone is set. This range of position at which the piston portion does not bear corresponds to the range in which the absolute value of the steering angle of the front wheels 10 is equal to or less than a predetermined value.

The piston rod 171 is pin-coupled to a link 173 which is pivotable about a pivot 173a. The other end of the link 173 is bifurcated at 173b, and this bifurcated portion is engaged with a pin 174 embedded in the output shaft 168. The force transmitted from the rod member 160 through the other rod member 170 and the piston rod 171 is amplified by the link 173 and this force becomes greater than the predetermined set load of the aforementioned spring member 165 and is transmitted to the output shaft 168 with its direction reversed. Accordingly, when the piston portion 172 of the piston rod 171 bears against one of the left and right walls 169a and 169b of the cylinder portion 169 and the reversed force is transmitted from the rod member 160 to the output shaft 168 through this route, the output shaft 168 relatively moves the first linear-acting member 163 or the second linear-acting member 164 in the cylinder portion 161 and is moved in the direction opposite to the direction of movement of the rod member 160 while compressing the spring member 165.

The output shaft 168 is formed with a rack 175 which is in mesh engagement with a pinion 176. The state of this portion as seen from the lateral side thereof is shown in FIG. 10. By the leftward and rightward movement of the output shaft 168, the pinion 176 is rotated and another pinion 178 coupled thereto by a shaft 177 is also rotated. Thus, the rack shaft 32 meshing with the pinion 178 by means of a rack portion 179 is moved to the left and right (up and down as viewed in FIG. 9). In this manner, in response to the leftward and rightward movement of the rack shaft 16 on the front wheel side, the rack shaft 32 on the rear wheel side also acts linearly with its direction reversed when the piston portion 172 of the piston rod 171 bears against the wall 169a or 169b of the cylinder portion 169, and acts linearly in the same direction when the piston portion 172 is not bearing against the wall 169a or 169b. The movement of the rack shaft 32 so moved, like the movement of the rack shaft on the front wheel side, is transmitted to the rear wheels 30 through a side rod 181 and a knuckle arm 182 and steers the rear wheels.

Operation of the embodiment having the above-described construction will now be described by reference to the graph of FIG. 3.

Assuming that the steering wheel 12 has been turned rightwardly from its neutral position N in which the steering angle is zero, the rack shaft 16 is moved downwardly as viewed in FIG. 9 (i.e., leftwardly) by the action of the pinion and rack mechanism 14 and steers the front wheels 10 to the right.

Simultaneously therewith, the L-shaped link 159 is turned leftwardly to cause the rod member 160 to act linearly in the forward direction of the vehicle. The force by this movement is transmitted to the output shaft 168 through the second shoulder 161b of the cylinder portion 161, the second linear-acting member 164, the spring member 165, the first linear-acting member 163 and the flange portion 166 and tends to move the output shaft forwardly. At this time, in a range in which the rightward steering angle of the front wheels is less than a predetermined value $\theta_1$, the piston portion 172 of the piston rod 171 does not yet bear against the right wall 169b of the cylinder portion 169 and therefore, the movement of the rod member 160 is only transmitted to the rod member 170 and is not transmitted to the piston rod 171 and no force is transmitted from the link 173 to the output shaft 168. Accordingly, the force transmitted from the piston rod 160 to the output shaft 168 through the spring member 165, etc. does not compress the spring member 165 but moves the output shaft 168 in the same direction as the rod member 160. This linear action of the output shaft 168 is transmitted to the rack shaft 32 through the pinions 176 and 178 and moves it leftwardly and finally steers the rear wheels 30 in the same direction as the front wheels 10.

However, when the rightward steering angle of the front wheels 10 becomes equal to or greater than said predetermined value $\theta_1$, the piston portion 172 comes to bear against the right wall 169b of the cylinder portion 169 and the movement of the rod member 160 is transmitted also to the piston rod 171 through the rod member 170 and is further transmitted as a reversed force to the output shaft 168 through the link 173. Thereupon, a force in the leftward direction, i.e., the second direction, is applied to the spring member 165 through the second shoulder 161b and the second linear-acting member 164 while, at the same time, a force in the rightward direction, i.e., the first direction, is applied to the spring member 165 through the flange portion 166 of the output shaft 168 and the first linear-acting member 163. The sum of these two forces is greater than the set load of the spring member 165 and the former of these two forces is smaller than the latter and therefore, only the first linear-acting member 163 is separated from the first shoulder 161a to compress the spring member 165 while the second linear-acting member 164 keeps bearing against the second shoulder 161b. Accordingly, the rod member 160 moves forwardly, i.e., leftwardly, whereas the output shaft 168 begins to move rearwardly, i.e., rightwardly, and the rear wheels 30 so far steered to the right begins to be steered to the left. Thus, when the front wheels 10 are further steered to the right, the rear wheels 30 pass their neutral position at the steering angle $\theta_3$ at last and are steered to the left.

When the steering wheel 12 is turned leftwardly from its neutral position, what has been described above also applies with the only exception that the operation is converse.

According to the present invention, as described above, a mechanical control device comprising biasing means such as a spring member, a link mechanism, etc. is used to take out the operating force from the front wheel steering device and this operating force is transmitted as a control force or a steering force to the rear wheel steering device and this is drivingly controlled and therefore, the number of electrical means and hydraulic means is not so great and the number of complicated wirings and pipings becomes relatively small, and this leads to a simple mechanism and simple maintenance, which in turn leads to a low cost.

We claim:

1. A four-wheel steering apparatus of a vehicle having:
    a front wheel steering device for steering the front wheels of the vehicle;
    a rear wheel steering device for steering the rear wheels of the vehicle, said rear wheel steering device including a mechanism having a power cylinder for hydraulically effecting the steering of the rear wheels;
    means for taking out a control force for said rear wheel steering device from said front wheel steering device;
    same direction steering control force transmitting means for transmitting said taken-out control force as a same direction steering control force for steering the rear wheels in the same direction as the front wheels;
    reverse direction steering control force transmitting means for transmitting said taken-out control force as a reverse direction steering control force reversed in direction and increased in magnitude for steering the rear wheels in the direction reverse to the front wheels;
    said same direction and reverse direction steering control forces being transmitted as the control force of valve means for controlling said power cylinder and steering the rear wheels;
    reverse direction steering control force insensitive zone setting means for absorbing said transmitted control force and disabling the transmission of the reverse direction steering control force when the absolute value of the steering angle of the front wheels is less than a predetermined value and enabling the transmission of the reverse direction steering control force when said absolute value is greater than said predetermined value; and
    reversible direction transmitting means for transmitting the same direction steering control force to said rear wheel steering device when it receives only such control force and absorbing the same direction steering control force by the reverse direction steering control force opposite in direction and great in magnitude and enabling only the reverse direction steering control force to be transmitted to said rear wheel steering device when it receives both of the same direction and the reverse direction steering control force;
    whereby the front wheels and the rear wheels are steered in the same direction when said absolute value is less than said predetermined value, and the rear wheels are steered in the direction reverse to the front wheels when said absolute value is greater than said predetermined value.

2. A four-wheel steering apparatus according to claim 1, wherein said means for taking out said control force has an input shaft rotatable in response to the operation of said front wheel steering device, said same direction steering control force transmitting means has a first rotatable member engaged with said input shaft so as to transmit only the rotation of said input shaft in a first direction of rotation and a second rotatable member engaged with said input shaft so as to transmit only the rotation of said input shaft in a second direction of rotation opposite to said first direction or rotation, said reversible direction transmitting means has biasing means disposed between said first and said second rotatable member for biasing said first rotatable member in a second direction of rotation and biasing said second rotatable member in a first direction of rotation, said rear wheel steering device has an output shaft engaged with said first rotatable member so as to be capable of receiving the rotation in the second direction of rotation from said first rotatable member and transmitting the rotation in the first direction of rotation to said first rotatable member and engaged with said second rotatable member so as to be capable of receiving the rotation in the first direction of rotation from said second rotatable member and transmitting the rotation in the second direction of rotation to said second rotatable member, and said reverse direction steering control force transmitting means has a gear mechanism provided between said input shaft and said output shaft for reversing the rotation of said input shaft and increasing the rotational force thereof and transmitting it to said output shaft.

3. A four-wheel steering apparatus according to claim 2, wherein said insensitive zone setting means is a meshing clutch mechanism which meshes with a play.

4. A four-wheel steering apparatus according to claim 1, wherein said front wheel steering device also has a mechanism including a power cylinder for hydraulically effecting the steering of the front wheels.

5. A four-wheel steering apparatus according to claim 2, wherein said means for taking out said control force takes out the control force from a piston rod of said front wheel steering device through a rack and pinion mechanism.

* * * * *